United States Patent [19]
Kanoh et al.

[11] Patent Number: 6,061,478
[45] Date of Patent: *May 9, 2000

[54] CONTENT-BASED FILING AND RETRIEVAL SYSTEM FOR NAME CARDS AND HANKOS

[75] Inventors: Toshio Kanoh, Mountain View; Jonathan J. Hull, Cupertino, both of Calif.

[73] Assignees: Ricoh Company, Ltd., Tokyo, Japan; Ricoh Corporation, Caldwell, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,929

[22] Filed: May 21, 1997

[51] Int. Cl.[7] .................................................... G06K 9/54
[52] U.S. Cl. ............................................................ 382/305
[58] Field of Search .................................. 382/305, 306, 382/218; 707/500; 235/375

[56] References Cited

U.S. PATENT DOCUMENTS

| | | | |
|---|---|---|---|
| 5,165,103 | 11/1992 | Takeda et al. | 382/305 |
| 5,369,508 | 11/1994 | Lech et al. | 382/306 |
| 5,493,105 | 2/1996 | Desai | 235/375 |
| 5,625,770 | 4/1997 | Nomura | 382/306 |
| 5,706,517 | 1/1998 | Dickinson | 395/683 |

OTHER PUBLICATIONS

Blomberg et al., "Reflections on a Work–Oriented Design Project," *Computer Interaction*, 2:237–265 (1996).

*Primary Examiner*—Yon J. Couso
*Attorney, Agent, or Firm*—Townsend and Townsend and Crew LLP

[57] ABSTRACT

In an improved filing and retrieval system, documents associated with a name card are scanned for electronic storage, the name card is scanned for electronic storage of its image and the electronic version of the document is associated with the electronic version of the name card. The name card is then stored in a name card file, usually a conventional name card storage system. When retrieval of a document associated with a particular name card is desired, the name card is obtained from the name card file, scanned, and the scanned image is matched to the previously stored scanned image of the name card. Once the correct name card is identified electronically, the associated documents are retrieved.

35 Claims, 5 Drawing Sheets

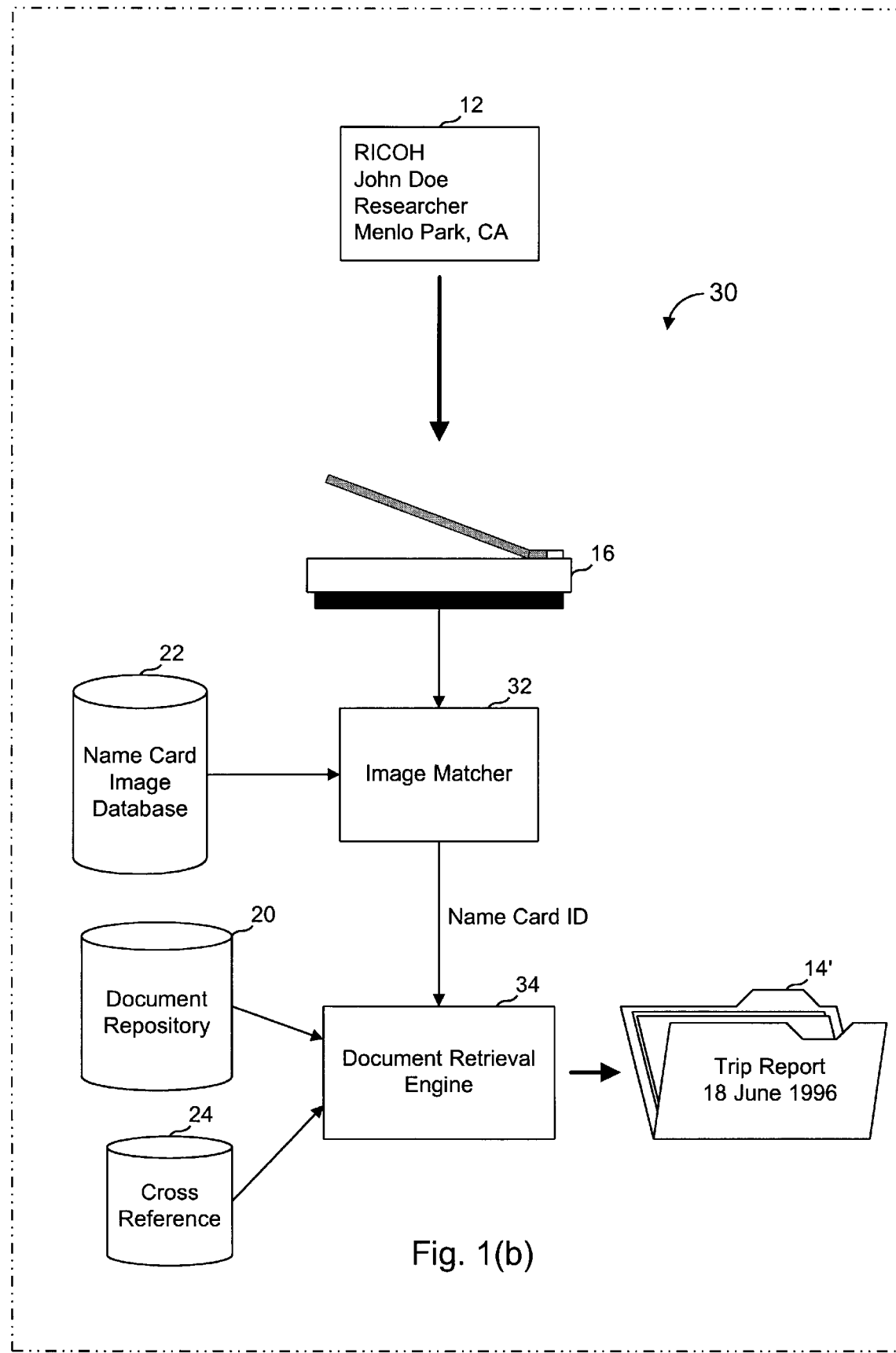

(a)

(b)

CONTENT-BASED FILING AND RETRIEVAL SYSTEM FOR NAME CARDS AND HANKOS

BACKGROUND OF THE INVENTION

The present invention relates to the field of information handling and processing. More specifically, in one embodiment, the present invention provides for improved filing and retrieval of name cards and hankos based on content.

A "hanko" is a stamp commonly used in Japan which encodes for a person's name and can be transferred to documents via a rubber stamp or similar process. Often, a business person could provide a business card, hanko or personal calling card (generally referred to as a "name card") when needed. When a person receives the name card, he or she might also obtain or create other documents, such as trip reports, meeting notes, or documents provided by the person giving the name card.

It is desirable to associate the name card with the documents, but filing systems for name cards, such as small desk-top box for business card storage, and filing systems for documents, such as file cabinets, are disjoint. Consequently, it is not convenient to store both the document and the name card in the same place.

One solution has been to store the document electronically and type in the name card information so the document can later be retrieved using a key word query.

Another solution is to scan the name card and perform OCR (optical character recognition) on the name card so that the name card data does not need to be typed in. This approach has its own disadvantages, such as the unreliability of OCR, the fact that many of the unique elements of the name card or hanko are not text, but are graphical or ideographic symbols, and that the person performing a query still has to perform data entry to locate a document.

Therefore, what is needed is a filing and retrieval system which follows how people are used to storing information and can store and retrieve information based on contents of a name card or hanko without requiring OCR.

SUMMARY OF THE INVENTION

An improved filing and retrieval system is provided by virtue of the present invention. In one embodiment, documents associated with a name card or hanko are scanned for electronic storage, the name card is scanned for electronic storage of its image and the electronic version of the document is associated with the electronic version of the name card. The name card is then stored in a name card file, usually a conventional name card storage system. When retrieval of a document associated with a particular name card is desired, the name card is obtained from the name card file, scanned, and the scanned image is matched to the previously stored scanned image of the name card. Once the correct name card is identified electronically, the associated documents are retrieved.

In a preferred embodiment, the system is an electronic document storage system with a document storage area and a name card image storage area (although these areas might just be different portions of a common memory) controlled by a digital computer interfaced to a scanner. In a specific embodiment, the digital computer is interfaced to a copier which acts as a scanner to scan name cards and documents and as a printer to print requested documents.

In an alternate embodiment, the system performs OCR on the name cards to extract information from the card in a digital form other than an image.

A further understanding of the nature and advantages of the inventions herein may be realized by reference to the remaining portions of the specification and the attached drawings.

BRIEF DESCRIPTION OF THE DRAWINGS

FIGS. 1a–1b are a block diagram of filing and retrieval system according to the present invention; FIG. 1(a) is a block diagram of the system in a filing mode; FIG. 1(b) is a block diagram of the system in a retrieval mode.

FIG. 3(a) is a flowchart of the filing process; FIG. 3(b) is a flowchart of the retrieval process.

DESCRIPTION OF THE PREFERRED EMBODIMENTS

The preferred embodiments for carrying out the invention will now be escribed with reference to specific uses of the invention, however the invention is not so limited. After reading this disclosure, the person of ordinary skill in the art will understand other useful variations of the embodiments described.

Figure 1A:
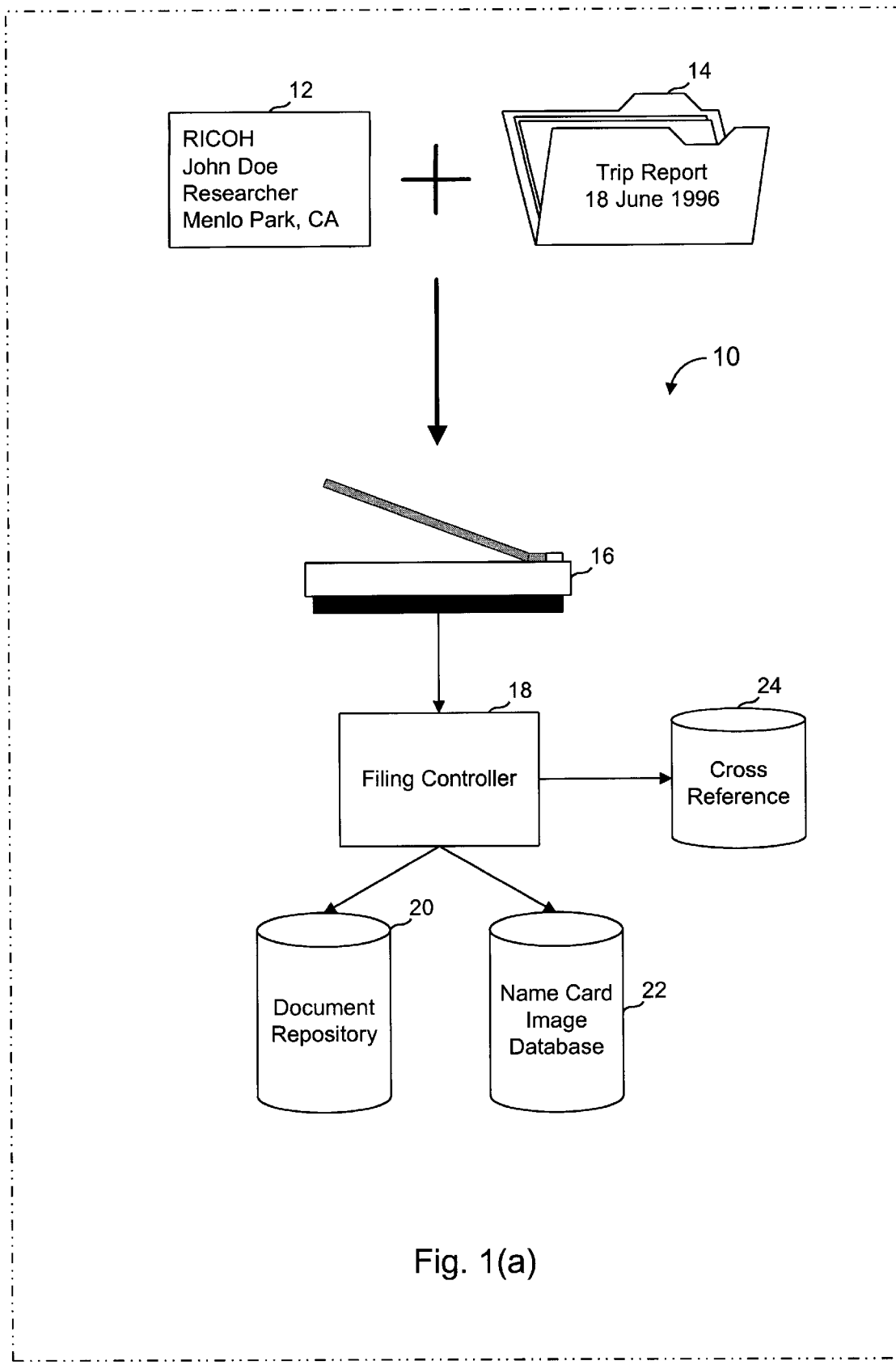

FIG. 1(a) is block diagram of a filing system 10 where documents are stored in association with a name card. Although the invention is described with reference to a name card, it should be understood that hankos, business cards and personal calling cards are forms of name cards, in that they identify a person. Filing system 10 includes a scanner 16 for scanning name cards, such as name card 12, and documents, such as documents 14, associated with name card 12. Scanner 16 produces digitized images of the name cards and documents and is coupled to provide these images to a filing controller 18. Filing controller 18 is coupled to a document repository 20, a name card image database 22 and a cross reference database 24. The details of what is sent by filing controller 18 to these components are explained below in connection with FIG. 3.

Document repository 20 holds scanned images of documents and might be a conventional document storage device. Name card image database 22 stores images of name cards, along with extracted features of the name card. The features are used to index the name card images within name card image database 22. A good example of an image and feature storage and indexing system is shown in U.S. Pat. No. 5,465,353 issued to Hull et al. and assigned to the assignee of the present application (hereinafter "Hull"). That patent is hereby incorporated by reference for all purposes. Cross reference database 24 is a data structure which associates a name card image in name card image database 22 with one or more documents in document repository 20. In some cases, more than one name card image might be associated with a given document, as might be the case when many people meet to discuss a single set of documents. In those cases, the document(s) can be retrieved using any one of the associated name cards.

FIG. 1(b) is a block diagram of a document retrieval system 30 which uses name cards to retrieve documents. In system 30, scanner 16 is provided to scan name cards, such as name card 12, to form a digitized image of the name card. Scanner 16 is coupled to provide these images to an image matcher 32. Image matcher 32 matches the scanned image to a name card image stored in name card image database 22, using methods such as those described in Hull. Image matcher 32 is coupled to provide an ID of the matched name card to a document retrieval engine 34. Document retrieval engine 34 is coupled to cross reference database 24, which allows document retrieval engine 34 to determine which documents are associated with the matched name card, and is also coupled to document repository 20, which allows document retrieval engine 34 to retrieve the documents of interest which are associated with the scanned name card.

In some embodiments, image matcher 32 and/or document retrieval engine 34 are interactive systems. With an interactive image matcher, a user can select among name cards when more than one match is found, or can reject a sole matching name card if it is not the desired name card. With an interactive document retrieval engine, the user can select among a plurality of documents associated with the matched name card.

It should be understood from this description that system 10 shown in FIG. 1(a) and system 30 shown in FIG. 1(b) can be combined into a filing and retrieval system with some elements (such as scanner 16) occurring only once. However, where the filing and the retrieval is done at different locations, the systems might be separate. Where filing and retrieval are done at separate locations, separate copies of document repository 20, name card image database 22 and cross reference database 24 might be used, or single copies might be accessible in the separate locations over a network or other remote data access mechanism. In a specific embodiment, the filing and retrieval system is integrated into an office copier, where a user can use the copier to scan the name card and documents, as well as print requested documents.

Figure 2:
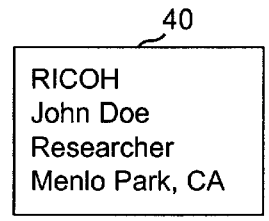
FIGS. 2a–2b are an illustration of a name card (FIG. 2(a)) and a hanko (FIG. 2(b)) as might be associated with a particular document or documents.
Figure 2:

FIG. 2 illustrates a name card and a hanko as might be used with the present invention. FIG. 2(a) is a simplified illustration of a business card 40, whereas FIG. 2(b) is an illustration of a hanko 42. While it might be practical to perform OCR on business card 40, this need not be done, since business card 40 is stored as an image. In many cases, OCR is impractical on hankos, because the hanko image might not contain complete characters, it might contain difficult-to-OCR ideograms and the hanko might contain non-character and non-ideogram graphical elements which are needed to distinguish one hanko from another. Since name cards are stored as images, business cards, personal calling cards and hankos can all be processed in the same manner.

Figure 3:
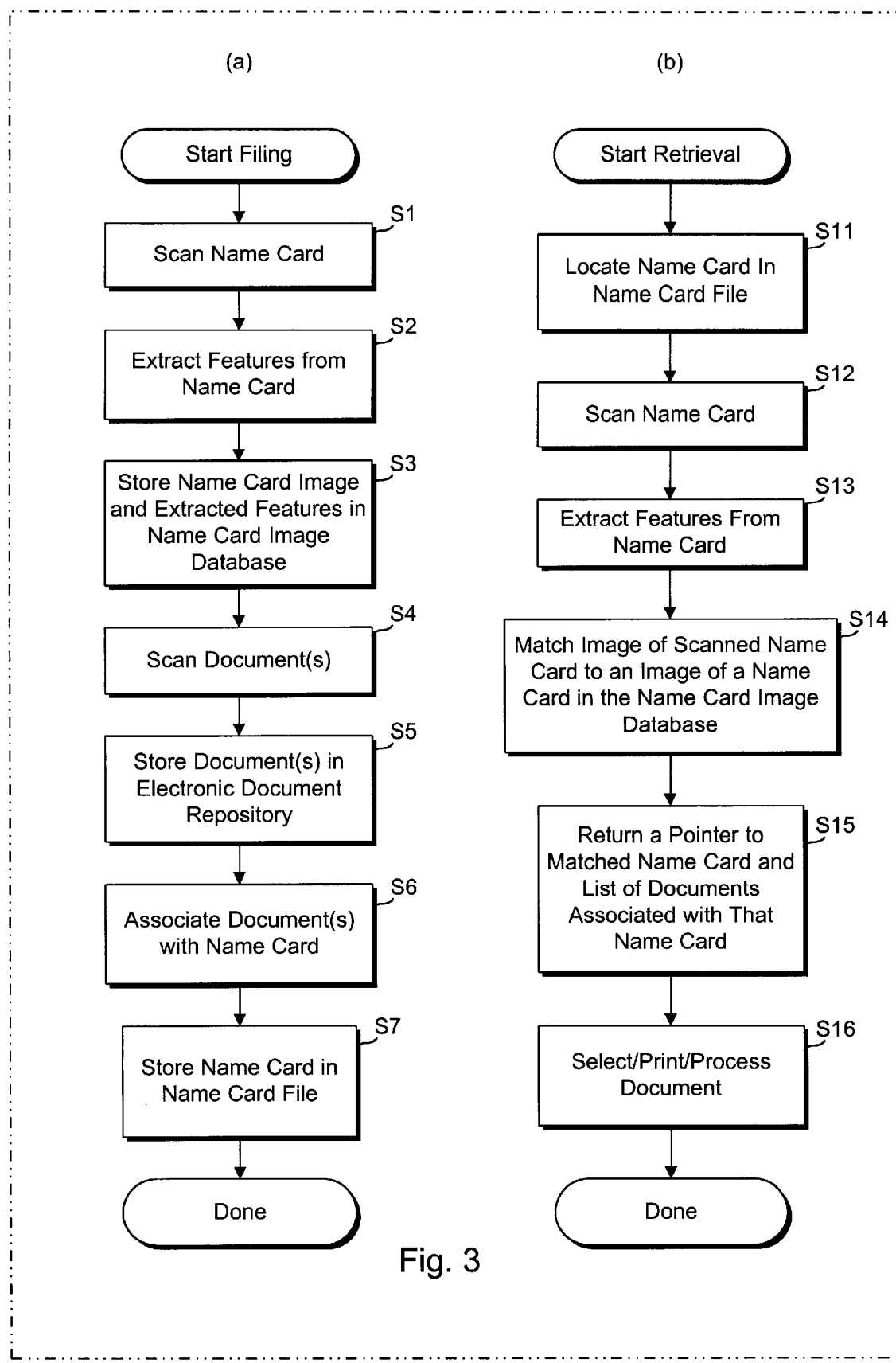
FIGS. 3a–3b are a flowchart of a filing and retrieval process according to the present invention.

Referring now to FIG. 3, flowcharts of the processes of filing and retrieving documents using name cards is there shown. FIG. 3(a) shows the process of filing a document or documents. We assume here that the user has a document, or documents, which has an associated name card. This usually occurs in a business setting, where the user is furnished with the documents and the business card or hanko of the person furnishing the documents. Of course, in the case of a hanko, being a personal seal, the hanko might appear on the document itself as a stamp placed by the person furnishing the documents. The steps of the process are labelled "S1" through "S7" and are performed in ascending order, but it should be understood that the steps need not be performed in exactly the order specified. For instance, the name card could be scanned either before or after the documents.

In the process shown in FIG. 3(a), the user scans the name card with which the documents are associated (S1), using the apparatus shown in FIG. 1(a) or the like. Once a digitized image is obtained, features are extracted from the name card image (S2), using a feature extraction process shown in Hull or similar process. The name card image and extracted features are stored in a name card database (S3). The features extracted might be the number of characters in English words on the name card, the density of ideograms on the name card, the x-y positions of pass codes in a CCITT fax-compressed binary image, or the like.

In the preferred embodiment, the name card image itself is stored, but as should be apparent from reading this description, if the retrieving user has no need to view the stored name card image, the documents can still be retrieved even if only the features of the name card image are stored in the name card database.

The user also scans the documents to be stored (S4) and stores those documents in an electronic document repository (S5). The documents, or their locations in the electronic document repository, are then associated with the name card (S6) by maintaining a pointer to a name card record in the name card image database and a pointer to the document, or documents, in a cross reference, or similar manner.

Once the document and the name card are scanned, the user can dispose or recycle the documents (or store them in paper files) and the user preferably saves the name card in a physical name card file (S7) to complete the storage process.

Referring now to FIG. 3(b), a flowchart is shown of a process for retrieving a document or documents stored according to the process shown in FIG. 3(a). The steps of the process labelled "S11" through "S16" are performed in ascending order, but they need not be performed in exactly the order specified.

In step S11, the user locates the physical name card associated with the documents to be retrieved and scans that name card (S12). Once scanned, the retrieval system extracts features from the name card (S13), preferably in the same manner as features were originally extracted in the storage process. Those extracted features are matched against the features of the name card images stored in the name card image database (S14). An example of such a process is shown in Hull. While this process is described with a step of matching features of a scanned name card with features stored in the name card image database, the name card image database might store only the name card images, with the features of name card images generated on the fly. The matching process might also use a hash table of English word lengths or a point set distance measure such as is used in the Hausdorff technique is shown in Huttenlocher, et al. "Comparing Images Using the Hausdorff Distance," *IEEE Transactions on Pattern Analysis and Machine Intelligence,* Vol. 15, No. 9, (September 1993), pp. 850–863, which is incorporated by reference herein for all purposes.

In any case, once a match is found, a pointer to the matched name card (a name card ID) is returned (S15). In an interactive system, if multiple close matches are found for the name card, the images corresponding to the multiple close matches can be displayed for manual user selection of the correct name card image. Once the correct name card is identified, a list of the documents associated with that name card can be provided. From that list, the user can select a document or a portion of a document, print a hard copy of the document, or perform electronic processing on the document (S16). Electronic document processing can take many forms, such as converting it to a text, or partial text, document for word processing, e-mailing the document or performing image processing on a document image.

Figure 4:
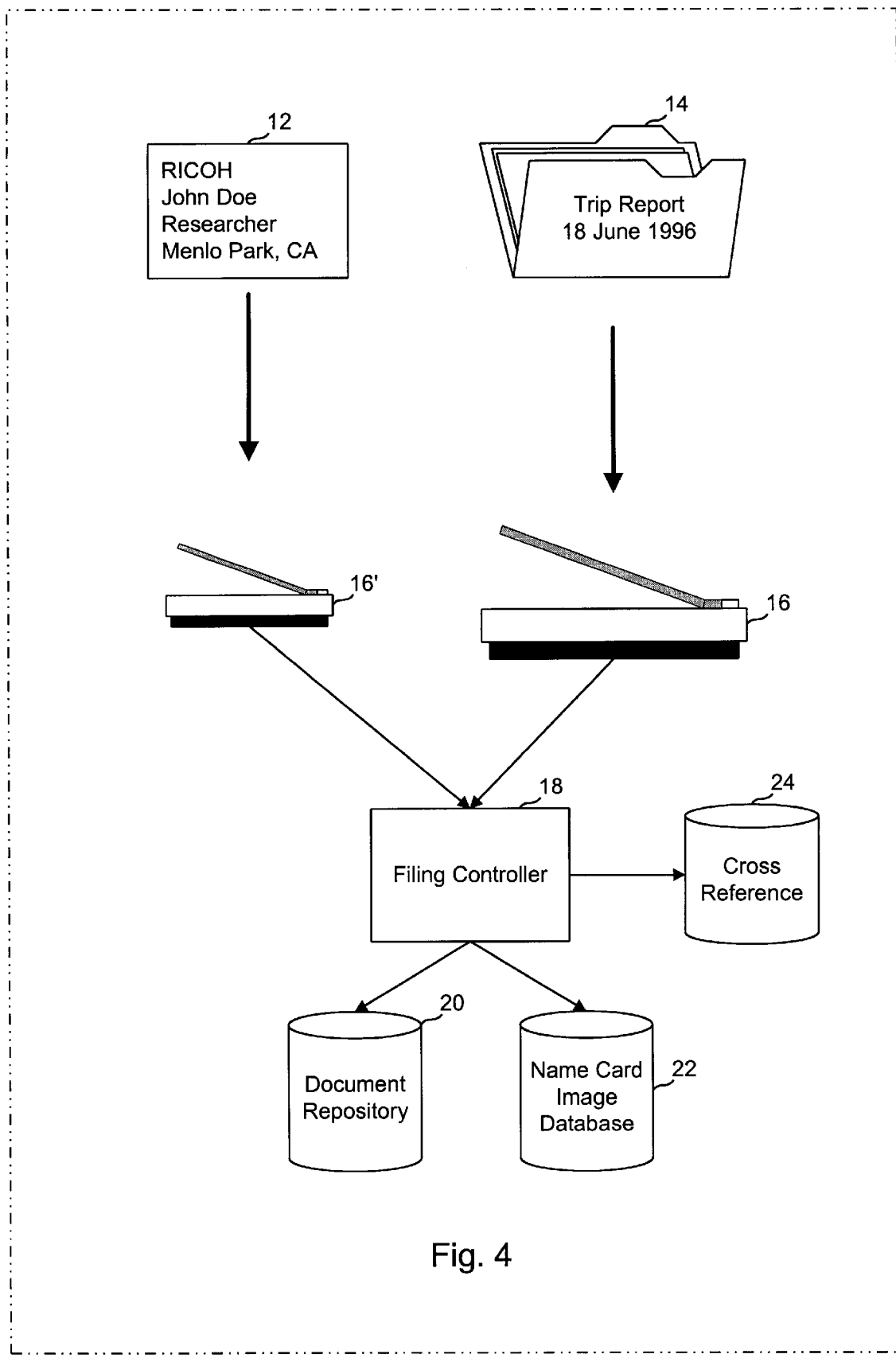
FIG. 4 is a block diagram of an alternate embodiment of a filing and retrieval system according to the present invention where separate specialized scanners are used for name cards and documents.

Referring now to FIG. 4, a variation of system 10 (FIG. 1(a)) is there shown. In that system, one scanner (16) is provided for document scanning and another scanner 16' is provided for name card scanning. Special purpose scanners for business card scanning are known in the art. Such a card scanner might fit more readily on a busy desk than a full-page document scanner. In one possible arrangement, documents and name cards are scanned and filed in a central location, such as a copy room, while documents are retrieved at a user's desk with a small name card scanner provided next to a small physical name card storage file, such as a Rolodex® business card file manufactured by the Rolodex Corporation of Secaucus, N.J.

A content-based filing and retrieval system according to the present invention has now been described. Such a system is useful since many documents are stored in digital image databases, and the use of such document repositories is expected to increase. The system is also useful where users are reluctant to use or unfamiliar with specialized document query languages and users are unwilling to enter key words upon storage of documents, which also requires that the key words be relevant and remembered. Such a system is convenient for use by users who already maintain a collection of business cards, personal calling cards and hankos. Among the many advantages of such a system are its intuitive paper user interface (PUI), the fact that filing is performed in a context-based manner, and that OCR is not required. If OCR is not needed, a less complex computing system can be used and the system costs can be reduced because the name cards could be scanned with a lower resolution scanner than would be needed for OCR. However, if the text of a name card is desired in electronic character form, the name card can be processed using OCR.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A document filing and retrieval apparatus comprising:
    means for scanning a first name card to produce a first electronic representation, said first name card comprising at least one graphic image;
    means for extracting a first plurality of features from said first electronic representation, said first plurality of features being extracted from said at least one graphic image;
    means for scanning a first document to produce a first electronic representation of said first document;
    means for storing said first electronic representation of said first document in an electronic document repository;
    means for storing said first plurality of features;
    means for associating said first plurality of features with said first electronic representation of said first document;
    means for scanning a second name card to produce a second electronic representation, said second name card comprising at least one graphic image;
    means for extracting a second plurality of features from said second electronic representation, said second plurality of features being extracted from said at least one graphic image;
    means for matching said second plurality of features with said first plurality of features, said means capable of determining whether said first plurality of features match said second plurality of features; and
    means for retrieving said first electronic representation of said first document associated with said first plurality of features if said means for matching determines that said first plurality of features matches said second plurality of features.

2. The apparatus of claim 1, wherein the first name card is one of a business card, a personal calling card, a personal seal, a stamp or a sheet containing a hanko.

3. The apparatus of claim 2, wherein said sheet containing said hanko is a portion of said document.

4. The apparatus of claim 1, wherein said first electronic representation of said first name card is an image of said first name card.

5. The apparatus of claim 1, wherein said first electronic representation includes an image of said first name card.

6. The apparatus of claim 1, wherein the means for scanning said first name card and said second name card and said means for scanning said first document further comprises a single multipurpose scanner.

7. The apparatus of claim 1, wherein the means for scanning said first name card and said second name card further comprises a first scanner, said first scanner operatively disposed to scan name cards and said means for scanning said document further comprises a second scanner, said second scanner operatively disposed to scan documents.

8. The apparatus of claim 1, wherein said at least one graphic image further comprises an ideogram.

9. The apparatus of claim 1, wherein said first name card further comprises English language text.

10. The apparatus of claim 1, wherein said first name card further comprises Japanese language text.

11. The apparatus of claim 1, wherein said means for matching further comprises a point set distance measure.

12. The apparatus of claim 1, wherein said means for matching further comprises a hash table.

13. The apparatus of claim 1, further comprising:
    means for scanning a second document to produce a second electronic representation of said second document;
    means for storing said second electronic representation of said second document in an electronic document repository;
    means for associating said first plurality of features with said second electronic representation of said second document;
    means for retrieving said second electronic representation of said second document associated with said first plurality of features if said means for matching determines that said first plurality of features matches said second plurality of features;
    means for providing a display of said first electronic representation of said first document and said second electronic representation of said second document.

14. The apparatus of claim 13 further comprising:
    means for receiving input of a selection from among said first electronic representation of said first document and said second electronic representation of said second document;
    means for providing either of said first document and said second electronic representation of said second document to a user based upon said selection.

15. The apparatus of claim 1, wherein said plurality of features are selected from number of characters, density of ideograms and x-y positions of pass codes.

16. A method for filing and retrieving documents, said method comprising:

scanning a first name card to produce a first electronic representation, said first name card comprising at least one graphic image;

extracting a first plurality of features from said first electronic representation, said first plurality of features being extracted from said at least one graphic image;

scanning a first document to produce a first electronic representation of said first document;

storing said first electronic representation of said first document in an electronic document repository;

storing said first plurality of features;

associating said first plurality of features with said first electronic representation of said first document;

scanning a second name card to produce a second electronic representation, said second name card comprising at least one graphic image;

extracting a second plurality of features from said second electronic representation, said second plurality of features being extracted from said at least one graphic image;

matching said second plurality of features with said first plurality of features, said matching including determining whether said first plurality of features match said second plurality of features; and retrieving said first electronic representation of said first document associated with said first plurality of features if said matching determines that said first plurality of features matches said second plurality of features.

17. The method of claim 16, wherein the first name card is one of a business card, a personal calling card, a personal seal, a stamp or a sheet containing a hanko.

18. The method of claim 17, wherein said sheet containing said hanko is a portion of said document.

19. The method of claim 16, wherein said first electronic representation of said first name card is an image of said first name card.

20. The method of claim 16, wherein said first electronic representation includes an image of said first name card.

21. The method of claim 16, wherein said scanning said first name card and said scanning said second name card and said scanning said first document further comprises scanning using a single multipurpose scanner.

22. The method of claim 16, wherein said scanning said first name card and said second name card further comprises scanning using a first scanner, said first scanner operatively disposed to scan name cards and said scanning said document further comprises scanning using a second scanner, said second scanner operatively disposed to scan documents.

23. The method of claim 16, wherein said at least one graphic image further comprises an ideogram.

24. The method of claim 16, wherein said first name card further comprises English language text.

25. The method of claim 16, wherein said first name card further comprises Japanese language text.

26. The method of claim 16, wherein said matching further comprises a point set distance measure.

27. The method of claim 16, wherein said matching further comprises a hash table.

28. The method of claim 16, further comprising:

scanning a second document to produce a second electronic representation of said second document;

storing said second electronic representation of said second document in an electronic document repository;

associating said first plurality of features with said second electronic representation of said second document;

retrieving said second electronic representation of said second document associated with said first plurality of features if said matching determines that said first plurality of features matches said second plurality of features;

providing a display of said first electronic representation of said first document and said second electronic representation of said second document.

29. The method of claim 13 further comprising:

receiving input of a selection from among said first electronic representation of said first document and said second electronic representation of said second document;

providing either of said first document and said second electronic representation of said second document to a user based upon said selection.

30. The method of claim 16, wherein said plurality of features are selected from number of characters, density of ideograms and x-y positions of pass codes.

31. A document filing and retrieval system comprising:

a scanner;

a filing controller, operatively connected to said scanner;

an electronic document repository, operatively connected to said filing controller to store a first electronic representation of a first document, a name card image database, operatively connected to said filing controller to store a first plurality of features; and a cross reference database, operatively connected with said filing controller to associate said first plurality of features in said name card image database with said first electronic representation of said first document in said electronic document repository;

wherein said scanner is operatively disposed to scan a first name card to produce said first electronic representation, said first name card comprising at least one graphic image, said scanner is further operatively disposed to scan said first document to produce said first electronic representation of said first document, said scanner is further operatively disposed to scan a second name card to produce a second electronic representation, said second name card comprising at least one graphic image;

said filing controller is operatively disposed to extract a first plurality of features from said first electronic representation, said filing controller is further operatively disposed to extract a second plurality of features from said second electronic representation, said second plurality of features being extracted from said at least one graphic image, said filing controller is further operatively disposed to match said second plurality of features with said first plurality of features, said matching further comprising determining whether said first plurality of features match said second plurality of features, said filing controller is further operatively disposed to retrieve said first electronic representation of said first document associated with said first plurality of features if said matching determines that said first plurality of features matches said second plurality of features.

32. A method for storing information, said method comprising:

scanning a first name card to produce a first electronic representation, said first name card comprising information, said information being independent of systematic arrangement;

extracting a first plurality of features from said first electronic representation, said first plurality of features being extracted from said information;

obtaining a first electronic representation of a first document;

storing said first electronic representation of said first document in an electronic document repository;

storing said first plurality of features;

associating said first plurality of features with said first electronic representation of said first document so that said first electronic representation of said first document can be retrieved by scanning a second name card, said second name card matching said first name card.

33. A method for storing and retrieving information, said method comprising:

scanning a first name card to produce a first electronic representation, said first name card comprising information, said information being independent of systematic arrangement;

extracting a first plurality of features from said first electronic representation, said first plurality of features being extracted from said information;

obtaining a first electronic representation of a first document;

storing said first electronic representation of said first document in an electronic document repository;

storing said first plurality of features;

associating said first plurality of features with said first electronic representation of said first document;

scanning a second name card to produce a second electronic representation, said second name card comprising information, said information being independent of systematic arrangement;

extracting a second plurality of features from said second electronic representation, said second plurality of features being extracted from said information;

matching said second plurality of features with said first plurality of features, said matching including determining whether said first plurality of features match said second plurality of features; and retrieving said first electronic representation of said first document associated with said first plurality of features if said matching determines that said first plurality of features matches said second plurality of features.

34. A computer program product for storing information, said computer program product comprising:

code for scanning a first name card to produce a first electronic representation, said first name card comprising information, said information being independent of systematic arrangement;

code for extracting a first plurality of features from said first electronic representation, said first plurality of features being extracted from said information;

code for obtaining a first electronic representation of a first document;

code for storing said first electronic representation of said first document in an electronic document repository;

code for storing said first plurality of features;

code for associating said first plurality of features with said first electronic representation of said first document so that said first electronic representation of said first document can be retrieved by scanning a second name card, said second name card matching said first name card; and a computer readable storage medium for storing the codes.

35. A computer program product for storing and retrieving information, said computer program product comprising:

code for scanning a first name card to produce a first electronic representation, said first name card comprising information, said information being independent of systematic arrangement;

code for extracting a first plurality of features from said first electronic representation, said first plurality of features being extracted from said information;

code for obtaining a first electronic representation of a first document;

code for storing said first electronic representation of said first document in an electronic document repository;

code for storing said first plurality of features;

code for associating said first plurality of features with said first electronic representation of said first document;

code for scanning a second name card to produce a second electronic representation, said second name card comprising information, said information being independent of systematic arrangement;

code for extracting a second plurality of features from said second electronic representation, said second plurality of features being extracted from said information;

code for matching said second plurality of features with said first plurality of features, said code for matching including code for determining whether said first plurality of features match said second plurality of features;

code for retrieving said first electronic representation of said first document associated with said first plurality of features if said code for matching determines that said first plurality of features matches said second plurality of features; and a computer readable storage medium for containing the codes.

* * * * *